US006961292B2

United States Patent
Ma et al.

(10) Patent No.: US 6,961,292 B2
(45) Date of Patent: Nov. 1, 2005

(54) APPARATUS GENERATING A SEEK DIRECTION DETECTING SIGNAL FOR AN OPTICAL PICKUP USING TRACK CROSS AND TRACK ERROR SIGNALS

(75) Inventors: Byung-in Ma, Suwon (KR); Chong-sam Chung, Suwon (KR); In-sik Park, Suwon (KR); Byoung-ho Choi, Suwon (KR); Tae-yong Doh, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 452 days.

(21) Appl. No.: 09/817,754

(22) Filed: Mar. 27, 2001

(65) Prior Publication Data

US 2001/0040850 A1 Nov. 15, 2001

(30) Foreign Application Priority Data

Mar. 28, 2000 (KR) ........................................ 2000-15873

(51) Int. Cl.[7] .............................................. G11B 7/085
(52) U.S. Cl. ................. 369/44.28; 369/120; 369/44.35; 369/44.37; 369/44.41
(58) Field of Search ............................. 369/44.28, 120, 369/44.35, 44.37, 44.41, 44.11, 53.28, 44.29

(56) References Cited

U.S. PATENT DOCUMENTS

| 5,412,630 A | | 5/1995 | Deguchi et al. |
|---|---|---|---|
| 5,815,473 A | | 9/1998 | Takahashi et al. |
| 5,828,634 A | | 10/1998 | Ohno et al. |
| 5,986,996 A | * | 11/1999 | Kitamura et al. ...... 369/112.16 |
| 6,147,952 A | * | 11/2000 | Watabe ........................ 369/111 |
| 6,282,164 B1 | * | 8/2001 | Katayama ............... 369/112.12 |
| 6,434,092 B1 | * | 8/2002 | Katayama ................ 369/44.23 |
| 6,507,544 B1 | * | 1/2003 | Ma et al. .................. 369/44.41 |

FOREIGN PATENT DOCUMENTS

| EP | 0 766 235 A1 | 4/1997 |
|---|---|---|
| EP | 0 945 859 A2 | 9/1999 |

* cited by examiner

Primary Examiner—Gautam R. Patel
(74) Attorney, Agent, or Firm—Stein, McEwen & Bui, LLP (57) ABSTRACT

An apparatus generating a seek direction detecting signal includes a light dividing unit dividing an incident light beam into at least two beams having a main beam and a sub-beam so that at least two beam spots including a main beam spot and at least one sub-beam spot having an optical aberration, can be focused in the track direction of an optical disk, the light dividing unit providing that the direction of the optical aberration of the sub-beam spot can be the tangential direction of the optical disk, an optical detector unit, a first signal processing portion processing a track error signal from signals output from the optical detector, a second signal processing portion processing a track cross signal from the signals output from the optical detector, and a generator generating the seek direction detecting signal from the phase difference between the track cross signal and the track error signal.

6 Claims, 12 Drawing Sheets

PRIOR ART

FIG. 1

PRIOR ART

APPARATUS GENERATING A SEEK DIRECTION DETECTING SIGNAL FOR AN OPTICAL PICKUP USING TRACK CROSS AND TRACK ERROR SIGNALS

CROSS-REFERENCE TO RELATED APPLICATIONS

This application claims the benefit of Korean Patent Application No. 00-15873, filed Mar. 28, 2000 in the Korean Intellectual Property Office, the disclosure of which is incorporated herein by reference. This application is related to the United States patent application having the Ser. No. 09/815,345.

BACKGROUND OF THE INVENTION

1. Field of the Invention

The present invention relates to an apparatus generating a seek direction detecting signal for an optical pickup determining the relative position of the center of an optical spot focused on an optical disk with respect to the center of a disk track in a RAM-type optical disk having a land/groove structure, and more particularly, to an apparatus generating a seek direction detecting signal for an optical pickup using a main beam and a sub-beam having a predetermined aberration in the tangential direction of an optical disk.

2. Description of the Related Art

In general, an optical pickup apparatus optically records or reproduces information of an optical disk such as a RAM disk, which is employed as a recording medium for recording/reproducing information. An optical pickup apparatus for this purpose comprises a light source emitting laser light, an objective lens converging light emitted from the light source on an optical disk to form an optical spot on the optical disk, an optical detector receiving light reflected from the optical disk and detecting an information signal and an error signal, and a signal processing portion processing the detected signals.

Figure 1:
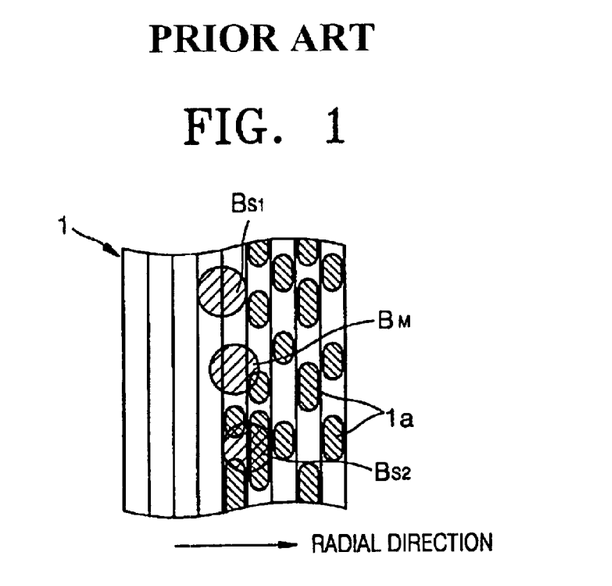
FIG. 1 is a schematic diagram illustrating optical spots focused on an optical disk by a conventional optical pickup.
Figure 2:
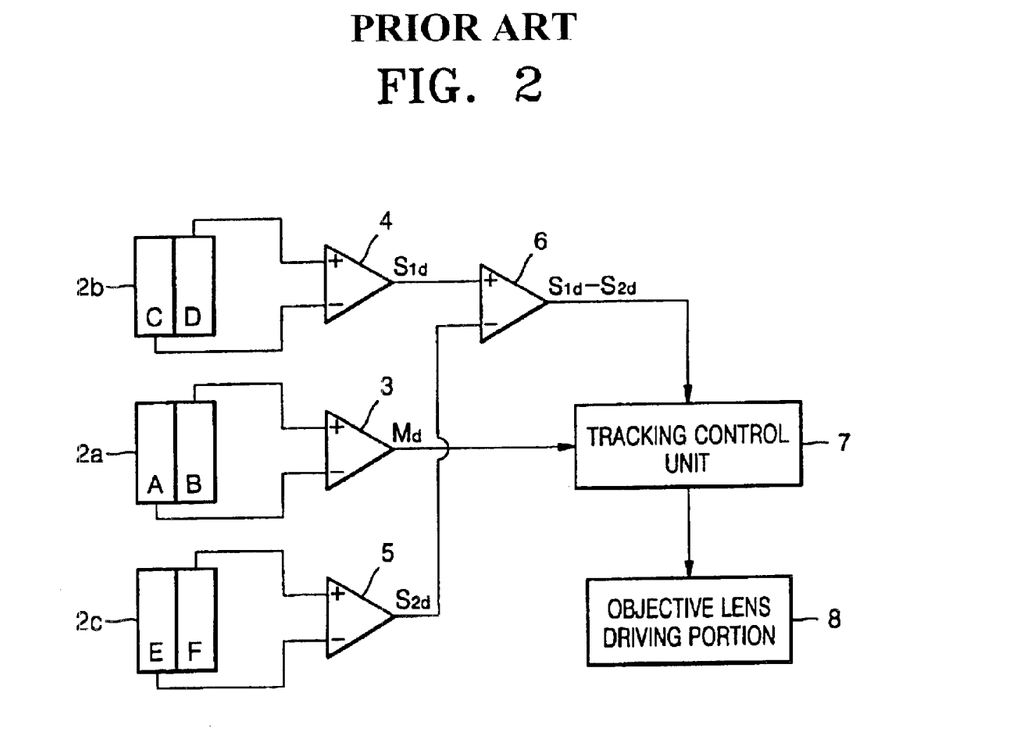
FIG. 2 is a schematic diagram illustrating a conventional apparatus generating a seek direction detecting signal for an optical pickup.

Referring to FIGS. 1 and 2, a conventional apparatus for generating a seek direction detecting signal for an optical pickup includes a grating (not shown) illuminating a track and adjacent tracks at the same time so as to record/reproduce information, an optical detector, and a signal processing portion.

Referring to FIG. 1, a spiral track having a land (L) and groove (G) structure, is formed on an optical disk 1, and information marks 1a are formed on the land (L) and groove (G). When information is recorded on or reproduced from the optical disk 1, light beams diverged by the grating are focused on the disk 1. That is, a main beam $B_M$ is focused on the track recording/reproducing information marks 1a, and first and second sub-beams $B_{S1}$ and $B_{S2}$, in which each sub-beam precedes or follows the main beam $B_M$ by a predetermined time, are focused on tracks of the optical disk 1 to be ±½ track pitch off the main beam $B_M$ in the radial direction of the optical disk 1.

The optical detector includes a main optical detector 2a for receiving the main beam $B_M$ reflected from the optical disk 1, and first and second optical sub-detectors 2b and 2c for receiving the first and second sub-beams, respectively. Here, the main optical detector 2a is comprised of two separated plates A and B separated in the radial direction of the optical disk 1 for receiving light independently of each other. In addition, the first and second optical sub-detectors 2b and 2c are comprised of two separated plates C and D, and two separated plates E and F separated in the radial direction of the optical disk 1, respectively.

The signal processing portion is comprised of a plurality of differential amplifiers 3, 4, 5, and 6 for differentiating and amplifying the signals detected by the main optical detector 2a, and the first and second optical sub-detector 2b and 2c to detect a track error signal (TES) and a track cross signal (TCS), a tracking control unit 7 receiving the detected track error signal (TES) and track cross signal (TCS) and outputting a tracking control signal, and an objective lens driving portion 8 actuating an objective lens according to the inputted tracking control signal.

The track error signal (TES) is generated by using a push-pull signal $M_d$ output from the main optical detector 2a. The track cross signal (TCS) is generated by using a difference signal $S_{1d}-S_{2d}$ of push-pull signals $S_{1d}$ and $S_{2d}$ output from the first and second optical sub-detectors 2b and 2c, respectively, and the push-pull signal $M_d$. Here, since the first and second sub-beam $B_{S1}$ and $B_{S2}$ are disposed ±½ track pitch off the main beam $B_M$, and therefore the push-pull signals $S_{1d}$ and $S_{2d}$ have phase differences of ±90° with respect to the push-pull signal $M_d$, the track cross signal can be detected by using the phase differences.

While the conventional apparatus for generating a seek direction detecting signal for an optical pickup, configured as described above, has an advantage in that the track cross signal can be detected in a relatively simple manner using the three beams, there is a problem in that, since the first and second sub-beams are disposed to precede and follow the main beam $B_M$, cross erasures occur to the adjacent track signals when a RAM-type optical disk is employed.

SUMMARY OF THE INVENTION

Accordingly, it is an objective of the present invention to provide an apparatus generating a seek direction detecting signal for an optical pickup capable of determining the relative position of the center of an optical spot focused on a RAM-type optical disk having a land/groove structure with respect to the center of a disk track using a main beam, and a sub-beam having a predetermined aberration in the tangential direction of the disk.

Additional objects and advantages of the invention will be set forth in part in the description which follows and, in part, will be obvious from the description, or may be learned by practice of the invention.

The foregoing objects of the present invention are achieved by providing an apparatus generating a seek direction detecting signal for an optical pickup including: a light dividing unit dividing an incident light beam into at least two beams including a main beam and a sub-beam so that at least two beam spots including a main beam spot and at least one sub-beam spot having an optical aberration, can be focused in the track direction of an optical disk, the light dividing unit being adapted so that the direction of the optical aberration of the sub-beam spot can be in the tangential direction of the optical disk; an optical detector unit including a first optical detector having a plurality of light receiving portions receiving the main beam, and converting the portions of the received main beam into independent electrical signals; and a second optical detector receiving the sub-beam, and converting the portions of the received beam into independent electrical signals so as to receive the main beam and the sub-beam reflected from the optical disk; and a signal processing portion including a first signal processing portion processing a track error signal from the signals output from the first optical detector; and a second signal processing portion processing a track cross signal from the signals output from the second optical detector, and a signal generator generating a seek direction detecting signal from the phase difference between the track error signal.

Here, it is preferable that the second optical detector is divided into at least three portions in a direction corresponding to the radial direction of the optical disk, is divided into two portions in a direction corresponding to the tangential direction of the optical disk, and has at least six separate areas.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout. The embodiments are described below in order to explain the present invention by referring to the figures.

Figure 3:
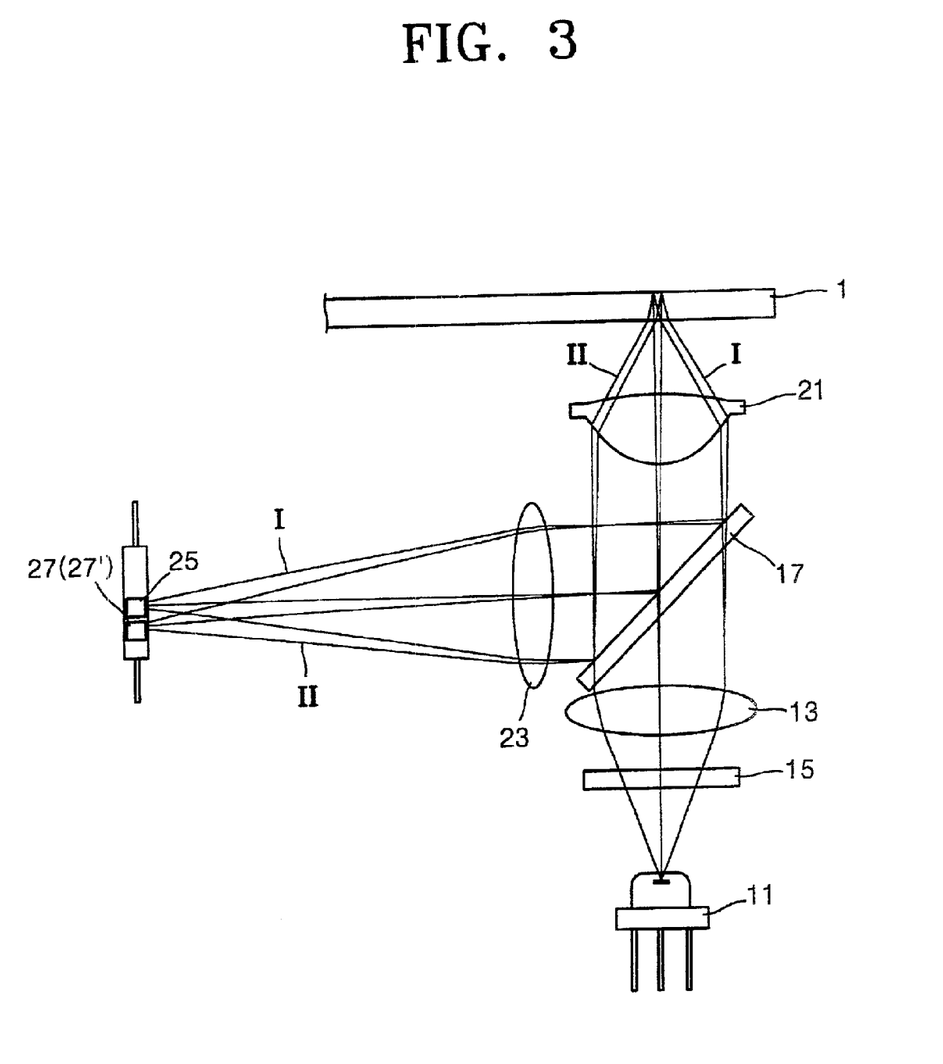
FIG. 3 is a diagram illustrating an optical layout of an optical pickup apparatus employing an apparatus generating a seek direction detecting signal according to an embodiment of the present invention.

Referring to FIG. 3, an optical pickup apparatus employing an apparatus generating a seek direction detecting signal according to the present invention includes a light source 11, an optical path changing unit changing the traveling path of an incident beam, an objective lens 21 converging the incident beam, and an apparatus generating a seek direction detecting signal. The apparatus generating a seek direction detecting signal includes a light dividing unit disposed between the light source 11 and an optical disk 1, an optical detector unit 25 and 27 receiving the beam reflected from the optical disk 1, and a signal processing portion processing the detected beam.

In order to enhance the recording capacity of an optical disk 1 of greater than 15 GB capacity, a light source for emitting light having a wavelength of about 410 nm and an objective lens having a numerical aperture of 0.6 or greater are employed as the light source 11 and the objective lens 21. The diverging light emitted from the light source 11 passes through a collimating lens 13, and is converged to be a collimated beam. The optical path changing unit is provided on the optical path between the light source 11 and the objective lens 21 so as to change the traveling path of the incident beam. That is, the incident beam from the light source 11 is directed toward the objective lens 21, and the incident beam from the objective lens is directed toward the optical detector unit 25 and 27. It is preferable that the optical path changing unit includes a beam splitter 17 changing the path of the incident beam by dividing the incident beam in a predetermined ratio, passing some portions of the incident beam, and reflecting the remainder.

Figure 4:
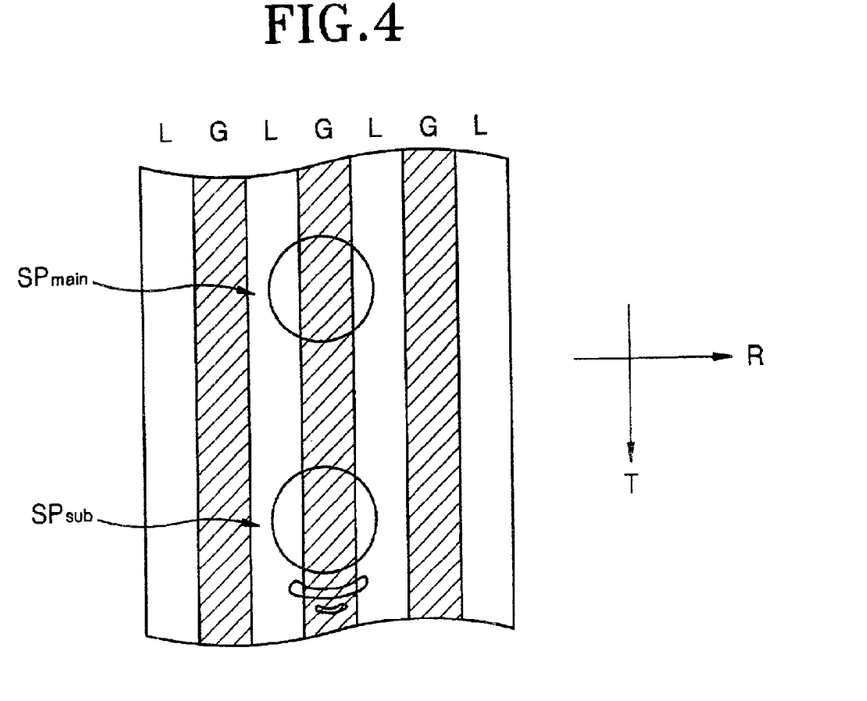
FIG. 4 is a schematic diagram illustrating a main beam spot $SP_{main}$ and a sub-beam spot $SP_{sub}$ formed on an optical disk.

The beam emitted from the light source 11 is diverged into at least two beams including a main beam I and a sub-beam II by the light dividing unit, and forms a main beam spot $SP_{main}$ and a sub-beam spot $SP_{sub}$, as shown in FIG. 4. Here, the main beam I forms the main beam spot $SP_{main}$ which does not have any aberration and the sub-beam II forms a sub-beam spot $SP_{sub}$ which has a predetermined optical aberration such as a coma.

In order to form the main beam spot $SP_{main}$ and the sub-beam spot $SP_{sub}$ as described above, i.e., in order to form the main beam spot $SP_{main}$ which does not exhibit any aberration and the sub-beam spot $SP_{sub}$ which has the predetermined optical aberration when the optical disk 1 is disposed in place without being inclined, it is preferable that the light dividing unit is provided with a holographic optical element 15 dividing the incident beam into the main beam I of the 0th-order diffracted beam, and the sub-beam II of the 1st-order diffracted beam, and giving the sub-beam II the predetermined aberration so that the sub-beam II can have the predetermined aberration while the main beam I does not have any aberration. The optical axis of the sub-beam II is formed to be slanted with respect to the optical axis of the main beam due to the coma, and the sub-beam II travels while being inclined in the tangential direction T of the optical disk 1 at a predetermined angle of inclination, and forms the sub-beam spot $SP_{sub}$ on the optical disk 1. In order to give the sub-beam the coma as described above, the holographic optical element 15 has a predetermined hologram pattern.

The light dividing unit may be designed to form another sub-beam spot (not shown) which precedes the main beam spot $SP_{main}$ in addition to the sub-beam spot $SP_{sub}$ which follows the main beam spot $SP_{main}$. In addition, the light dividing unit may be designed to form a pair of sub-beam spots $SP_{sub}$, one of which precedes the main beam spot $SP_{main}$, and another which follows the main beam spot $SP_{main}$.

The objective lens 21 converges the main beam I and the sub-beam II diverged by the hologram optical element 15, and focuses the beams I and II on the optical disk 1. Here, the sub-beam II is focused on the same track as the main beam I. However, the sub-beam II has an aberration in the tangential direction of the optical disk, given by the hologram optical element 15 described above.

Figure 5:
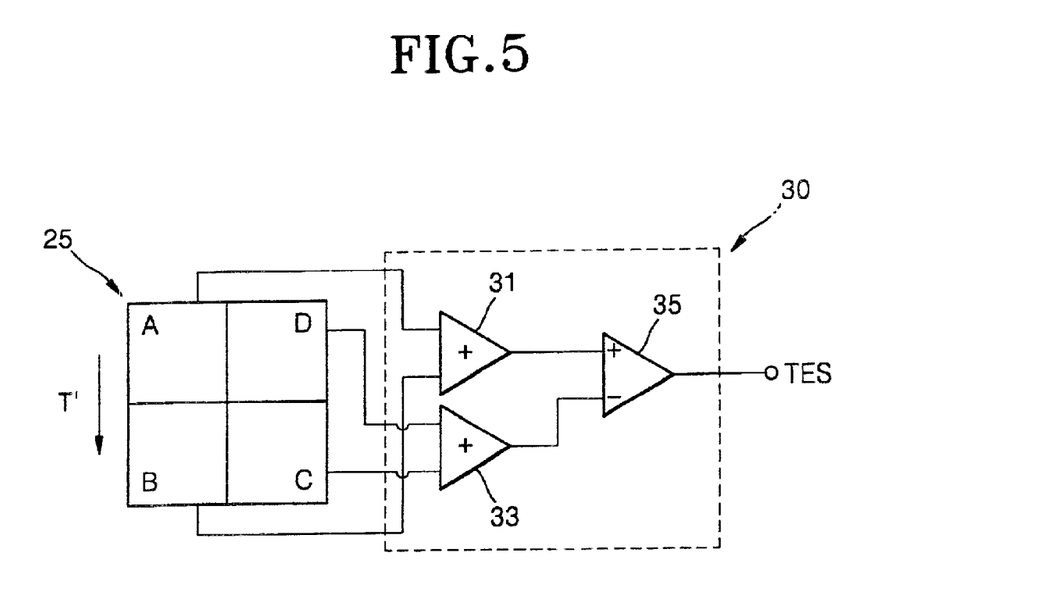
FIG. 5 is a schematic diagram illustrating the structure of a first optical detector according to an embodiment of the present invention, and a first signal processing portion for processing signals output from the first optical detector.

After the main beam I and the sub-beam II, which are reflected from the optical disk 1, pass through the objective lens 21 and reflect off the beam splitter 17, the main beam I and the sub-beam II are converged by a converging lens 23 and are received by the optical detector unit. The optical detector unit comprises a first optical detector 25 receiving the main beam I, and a second optical detector 27 or 27' receiving the sub-beam II. Referring to FIG. 5, the first optical detector 25 has a plurality of light receiving portions A, B, C, and D receiving the main beam I, and converting the respective optical signals into independent electrical signals.

Figure 6:
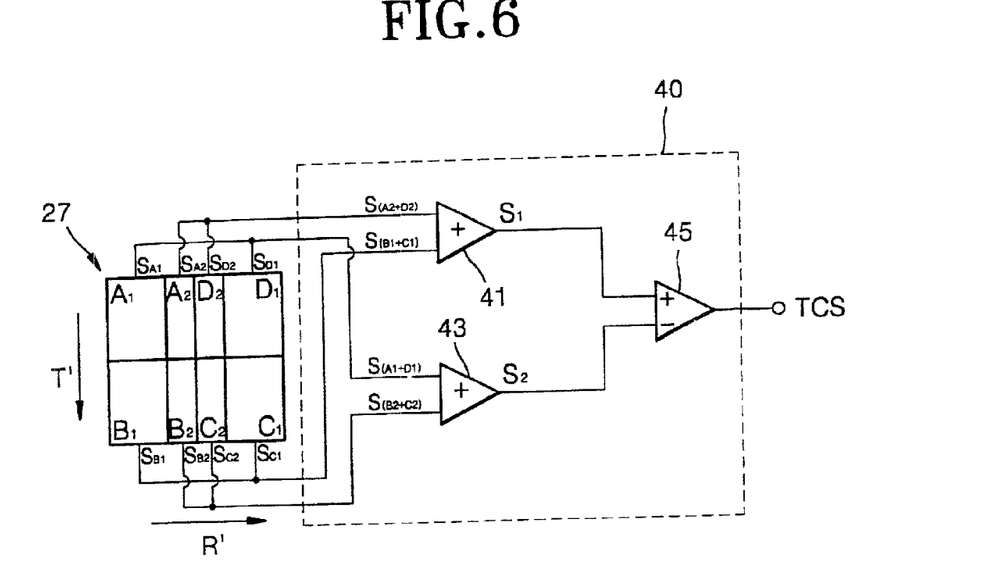
FIG. 6 is a schematic diagram illustrating the structure of a second optical detector according to an embodiment of the present invention, and a second signal processing portion of the same embodiment processing signals output from the second optical detector.

A second optical detector 27 receiving the sub-beam II and converting received optical signals into independent electrical signals, is divided into four portions in a direction R' corresponding to the radial direction R of the optical disk 1, and is divided into 2 portions in a direction T' corresponding to the tangential direction T of the optical disk 1. Therefore, the second optical detector 27 is divided into eight separate areas. When briefly reviewing this structure, the second optical detector 27 has four light receiving portions having a 2×2 array, as in a conventional four-division optical detector, i.e., first, second, third, and fourth light receiving portions, and each light receiving portion is again divided into an inner light receiving portion and an outer light receiving portion in the direction R'. That is, the first light receiving portion is comprised of a first outer light receiving portion $A_1$ and a first inner light receiving portion $A_2$. The second light receiving portion is disposed to neighbor the first light receiving portion in the tangential direction T', and is comprised of a second outer light receiving portion $B_1$ and a second inner light receiving portion $B_2$. The third light receiving portion is disposed to neighbor the second light receiving portion in the direction R', and is composed of a third outer light receiving portion $C_1$ and a third inner light receiving portion $C_2$. In addition, the fourth light receiving portion is disposed to neighbor the first and third light receiving portions, and is comprised of a fourth outer light receiving portion $D_1$ and a fourth inner light receiving portion $D_2$.

Here, in order to generate a seek direction detecting signal, it is preferable that the individual widths of the first, second, third, and fourth inner light receiving portions $A_2$, $B_2$, $C_2$, and $D_2$ are smaller than the radius of the incident beam spot focused on the second optical detector 27. It is more preferable that the sum of the widths of the first and fourth inner light receiving portions $A_2$ and $D_2$ in the direction R' and the sum of the widths of the second and third inner light receiving portions $B_2$ and $D_2$ in the direction R' are each 0.2 to 0.8 times the diameter of the incident beam focused on the second optical detector 27.

Referring to FIGS. 5 through 10, the signal processing portion includes a first signal processing portion 30 detecting a track error from the signal output from the first optical detector 25, and a second signal processing portion 40, 50, 60, 70 or 80 generating a track cross signal from the signal detected by the second optical detector 27.

Referring to FIG. 5, the first signal processing portion 30 sums and differentiates electrical signals output from the four light receiving portions A, B, C, and D of the first optical detector 25, and outputs a track error signal (TES). To this end, the first signal processing portion 30 comprises a summing amplifier 31 summing signals detected by the light receiving portions A and B disposed to neighbor and be parallel to each other in the direction T', a summing amplifier 33 summing signals detected by the light receiving portions C and D, and a differential amplifier 35 differentiating signals output from the summing amplifiers 31 and 33. That is, the first signal processing portion 30 outputs a track error signal by using a push-pull signal output from the main beam I.

Referring to FIG. 6, the second signal processing portion 40 according to an embodiment of the present invention comprises first and second summing amplifiers 41 and 43, and a differential amplifier 45.

Figure 21:
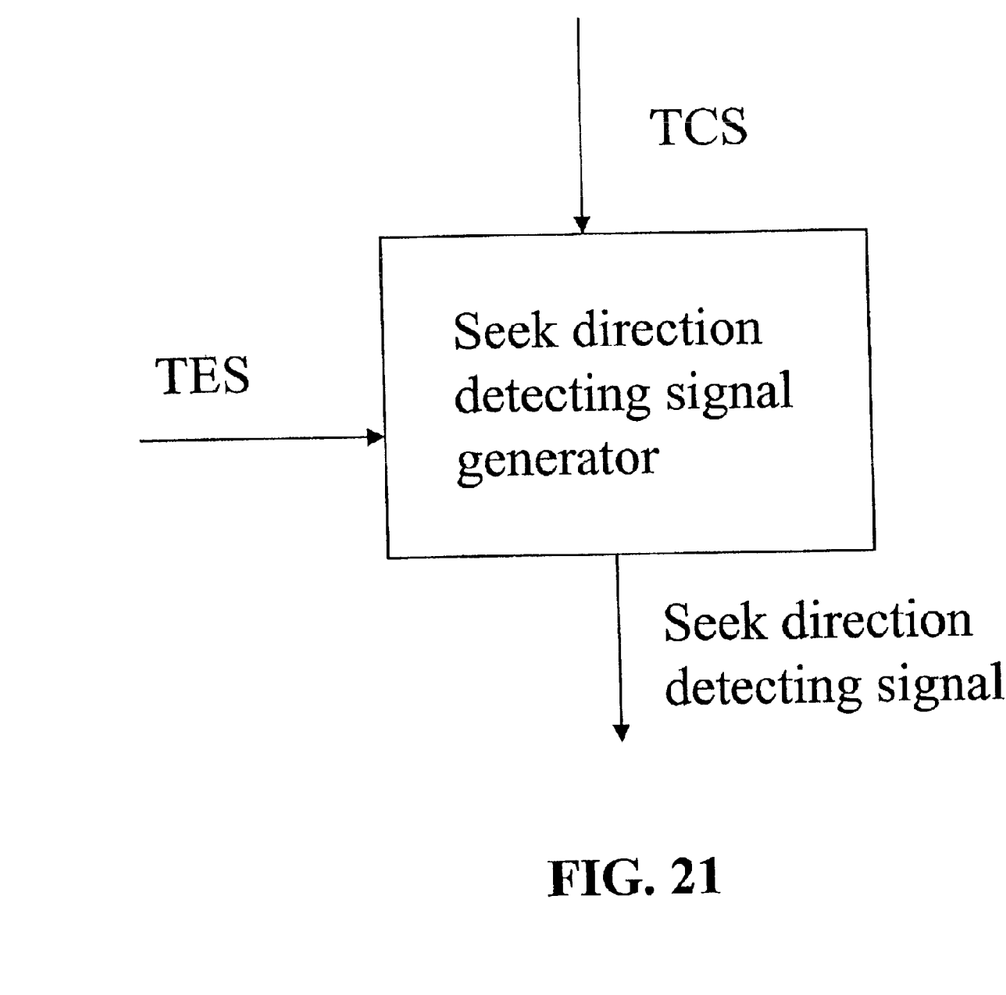
FIG. 21 illustrates a signal generator that generates a seek direction detection signal.

When the sum of signals output from the first inner light receiving portion $A_2$ and the fourth inner light receiving portion $D_2$ is $S_{(A2+D2)}$, and the sum of signals output from the second outer light receiving portion $B_1$ and the third outer light receiving portion $C_1$ is $S_{(B1+C1)}$, the first summing amplifier 41 sums the signals $S_{(A2+D2)}$ and $S_{(B1+C1)}$, and outputs a signal $S_1$. When the sum of signals output from the first outer light receiving portion $A_1$ and the fourth outer light receiving portion $D_1$ is $S_{(A1+D1)}$, and the sum of signals output from the second inner light receiving portion $B_2$ and the third inner light receiving portion $C_2$ is $S_{(B2+C2)}$, the second summing amplifier 43 sums the signals $S_{(A1+D1)}$ and $S_{(B2+C2)}$, and outputs a signal $S_2$. Then, the differential amplifier 45 differentiates the signals $S_1$ and $S_2$, and outputs a track cross signal. A seek direction detecting signal can be generated by using the phase difference between the track cross signal (TCS) output from the differential amplifier 45 and the track error signal (TES) output from the first signal processing portion 30. An example of a seek direction detecting signal generator is illustrated in FIG. 21 and is discussed in further detail below.

Figure 7:
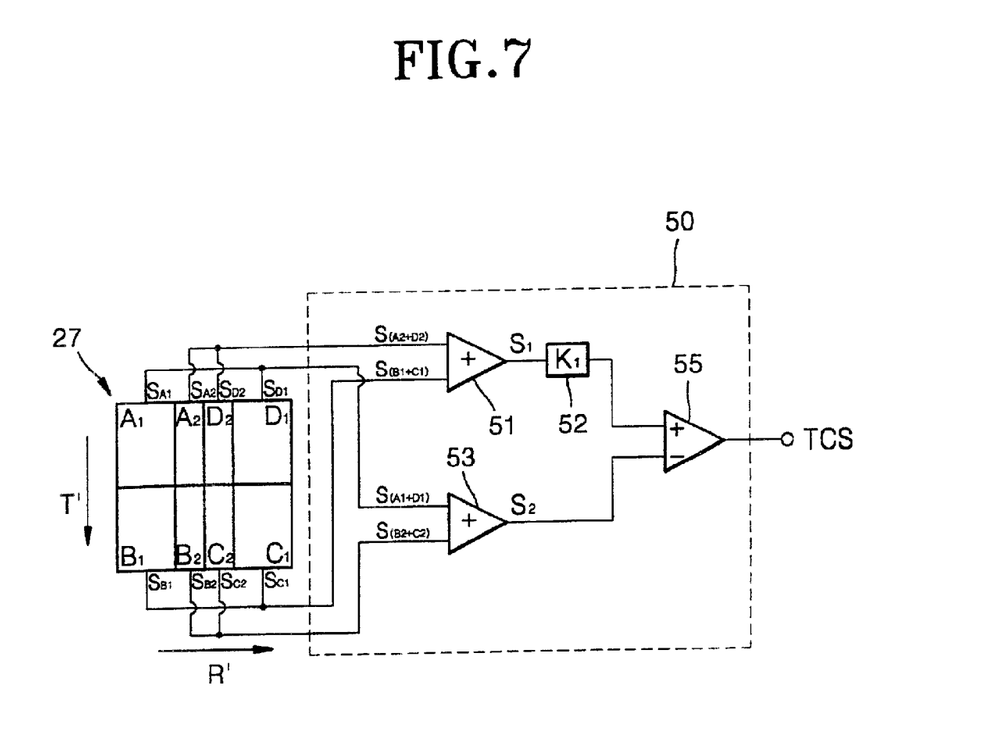
FIG. 7 is a schematic diagram illustrating yet another embodiment of a second signal processing portion according to the present invention.

Referring to FIG. 7, the second signal processing portion 50 according to another embodiment of the present invention comprises first and second summing amplifiers 51 and 53, a gain adjusting unit 52, and a differential amplifier 55.

Here, the first and second summing amplifiers 51 and 53 perform the same function as the summing amplifiers 41 and 43 previously described with reference to FIG. 6, and outputs signals $S_1$ and $S_2$, respectively. The gain adjusting unit 52 multiplies the signal $S_1$ output from the first summing amplifier 51 by a predetermined gain coefficient $K_1$, and outputs an adjusted signal $K_1 \times S_1$. In addition, the summing amplifier 55 sums the signal $S_2$ and the signal $K_1 \times S_1$, and outputs a track cross signal (TCS). Therefore, a seek direction detecting signal can be generated by using a phase difference between the output track cross signal (TCS) and the track error signal (TES) output from the first signal processing portion 30.

Figure 8:
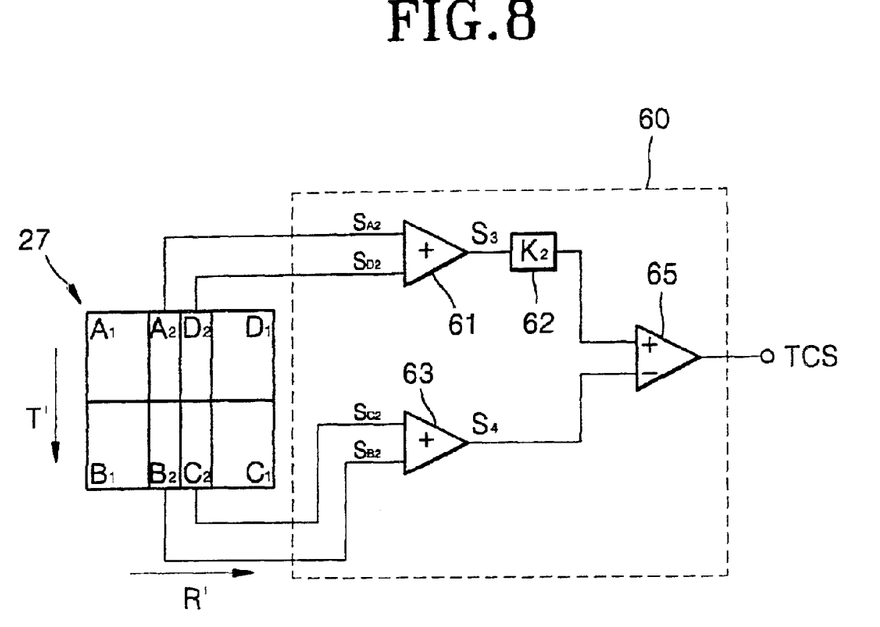
FIG. 8 is a schematic diagram illustrating yet another embodiment of a second signal processing portion according to the present invention.

Referring to FIG. 8, the second signal processing portion 60 according to another embodiment of the present invention comprises first and second summing amplifiers 61 and 63, a gain adjusting unit 62, and a differential amplifier 65. The first summing amplifier 61 sums a signal $S_{A2}$ output from the first inner light receiving portion $A_2$ and a signal $S_{D2}$ output from the fourth inner light receiving portion $D_2$, and outputs a sum signal $S_3$. The second summing amplifier 63 sums a signal $S_{B2}$ output from the second inner light receiving portion $B_2$ and a signal $S_{C2}$ output from the third inner light receiving portion $C_2$, and outputs a sum signal $S_4$. In addition, the gain adjusting unit 62 multiplies the input signal $S_3$ by a predetermined gain coefficient $K_2$, and outputs a signal $K_2 \times S_3$. The differential amplifier 65 differentiates the signal $S_4$ and the signal $K_2 \times S_3$, and outputs a track cross signal (TCS). Therefore, a seek direction detecting signal can be generated by using the phase difference between the output track cross signal (TCS) and the track error signal (TES) output from the first signal processing portion 30.

Figure 9:
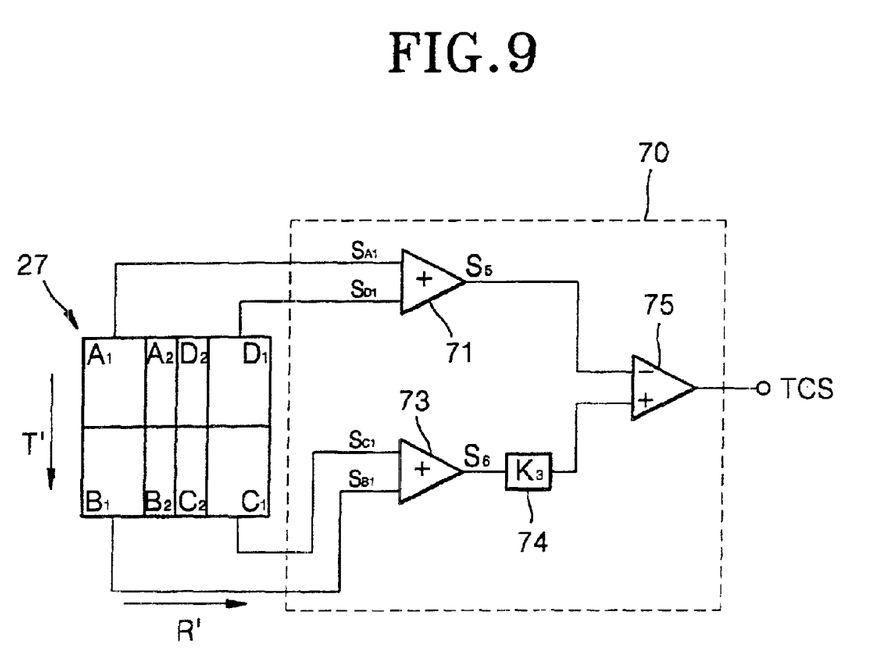
FIG. 9 is a schematic diagram illustrating yet another embodiment of a second signal processing portion according to the present invention.

Referring to FIG. 9, the second signal processing portion 70 according to another embodiment of the present invention comprises first and second summing amplifiers 71 and 73, a gain adjusting unit 74, and a differential amplifier 75.

The first summing amplifier 71 sums a signal $S_{A1}$ output from a first outer light receiving portion $A_1$ and a signal $S_{D1}$ output from a fourth outer light receiving portion $D_1$, and outputs a sum signal $S_5$. The second summing amplifier 73 sums a signal $S_{B1}$ output from a second outer light receiving portion $B_1$ and a signal $S_{C1}$ output from a third outer light receiving portion $C_1$, and outputs a sum signal $S_6$. The gain adjusting means 74 multiplies the signal $S_6$ output from the second summing amplifier 73 by a predetermined gain coefficient $K_3$, and outputs a signal $K_3 \times S_6$. The differential amplifier 75 differentiates the signal $S_5$ and the signal $K_3 \times S_6$, and outputs a track cross signal (TCS). Therefore, a seek direction detecting signal can be generated by using the phase difference between the output track cross signal (TCS) and the track error signal (TES) output from the first signal processing portion 30.

Figure 10:
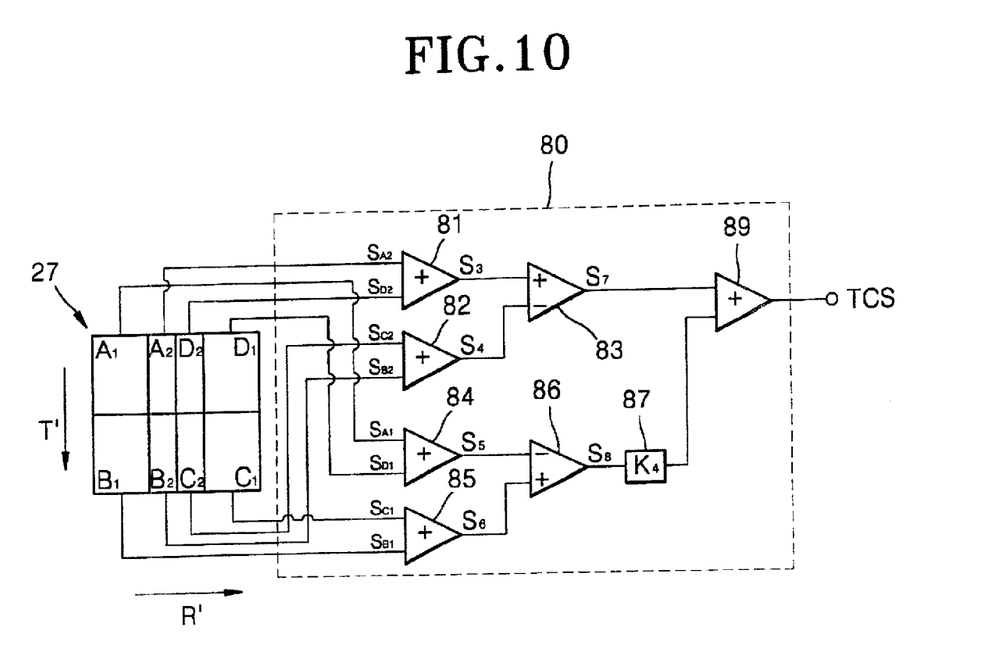
FIG. 10 is a schematic diagram illustrating yet another embodiment of a second signal processing portion according to the present invention.

Referring to FIG. 10, when signals respectively output from first, second, third, and fourth outer light receiving portions $A_1$, $B_1$, $C_1$, and $D_1$ are $S_{A1}$, $S_{B1}$, $S_{C1}$, and $S_{D1}$, signals respectively output from first, second, third, and fourth inner light receiving portions $A_2$, $B_2$, $C_2$, and $D_2$ are $S_{A2}$, $S_{B2}$, $S_{C2}$, and $S_{D2}$, and a predetermined gain coefficient applied to a signal inputted into a gain adjusting unit is $K_4$, the second signal processing portion 80 according to another embodiment of the present invention processes a signal so as to satisfy the following formula (1), and outputs a track cross signal (TCS).

$$TCS = ((S_{A2} + S_{D2}) - (S_{B2} + S_{C2})) + K_4((S_{B1} + S_{C1}) - (S_{A1} + S_{D1})) \quad (1)$$

In order to get a track cross signal (TCS), the second signal processing portion 80 includes first, second, third, and fourth summing amplifiers 81, 82, 84, and 85, first and second differential amplifiers 83 and 86, a gain adjusting unit 87, and a fifth summing amplifier 89.

The first summing amplifier 81 sums signals $S_{A2}$ and $S_{D2}$, and outputs a signal $S_3$. The second summing amplifier 82 sums signals $S_{B2}$ and $S_{C2}$, and outputs a signal $S_4$. In addition, the third summing amplifier 84 sums signals $S_{A1}$ and $S_{D1}$, and outputs a signal $S_5$. The fourth summing amplifier 85 sums signals $S_{B1}$ and $S_{C1}$, and outputs a signal $S_6$.

The first differential amplifier 83 differentiates the signals $S_3$ and $S_4$, and outputs a signal $S_7$, and the second differential amplifier 86 differentiates the signals $S_5$ and $S_6$, and outputs a signal $S_8$. In addition, the gain adjusting unit 87 multiplies the signal $S_8$ output from the second differential amplifier 86 by a predetermined gain coefficient $K_4$, and outputs a signal $K_4 \times S_8$. The fifth summing amplifier 89 sums the signals $S_7$ and $K_4 \times S_8$, and outputs a track cross signal (TCS).

Therefore, a seek direction detecting signal can be generated by using the phase difference between the output track cross signal (TCS) and the track error signal (TES) output from the first signal processing portion 30.

The structures of the second signal processing portion according to the above-described embodiments are shown as examples when the sub-beam spot $SP_{sub}$ is disposed, as shown in FIG. 4. Therefore, when a sub-beam spot preceding the main beam spot exists, when a pair of sub-beam spots, one of which precedes the main beam spot and another which follows the main beam spot exist, or when the aberration direction of the sub-beam spot is changed, the waveform of the signal output from the second signal processing portion may be inverted. Since an inverted waveform such as this can be corrected by changing the input end of the differential amplifier, or by using an inverter, a detailed description thereof will be omitted.

Now, referring to FIGS. 11 through 15, the operation of an apparatus generating a seek direction detecting signal for an optical pickup according to an embodiment of the present invention is described below.

In FIGS. 11 through 15, the horizontal axis represents positions of tracks by using a track pitch (Tp) of an optical disk, and the vertical axis represents magnitudes of an output signal at the positions of tracks. Here, the track pitch (Tp) is the distance between the center of a land and the center of an adjacent groove or between the center of a groove and the center of an adjacent land in a land/groove structure recording or reproducing a signal onto or from the optical disk, and the labels on the horizontal axis, 1, 2, 3, . . . , indicate distances corresponding to 1 time, 2 times, 3 times, . . . , the track pitch (Tp). That is, in the horizontal axis, when the points indicated by 0, 2, 4, and 6 are the centers of respective grooves, the points indicated by 1, 3, and 5 are the centers of respective lands.

Figure 11:
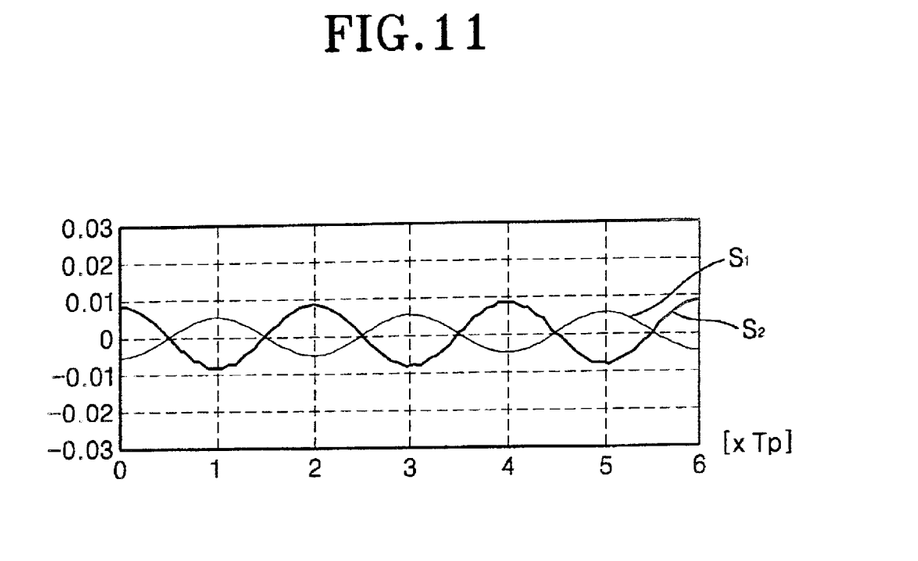
FIG. 11 is a diagram illustrating waveforms of signals $S_1$ and $S_2$ output from first and second summing amplifiers, respectively, shown in FIG. 7 when beam spots are in off-track states.

FIG. 11 shows waveforms of a signal $S_1$ output from the first summing amplifier 41 or 51 shown in FIGS. 6 and 7, and a signal $S_2$ output from the second summing amplifier 43 or 53, when beam spots are in off-track states, and when an aberration of the sub-beam II in a tangential direction is 0.5 degrees. Reviewing FIG. 11, it can be found that the output signals $S_1$ and $S_2$ exhibit inverted waveforms with respect to each other. That is, since the sub-beam II has a predetermined aberration in the tangential direction of the optical disk, it can be found that when the points 1, 3, 5, . . . along the horizontal axis represent the centers of land tracks, and the points 0, 2, 4, 6, . . . along the horizontal axis represent the centers of groove tracks, the signal $S_1$ has positive peak values at the centers of land tracks while the signal $S_2$ has negative peak values at the centers of land tracks. The signals $S_1$ and $S_2$ exhibit opposite cases at the centers of the groove tracks.

Figure 12:
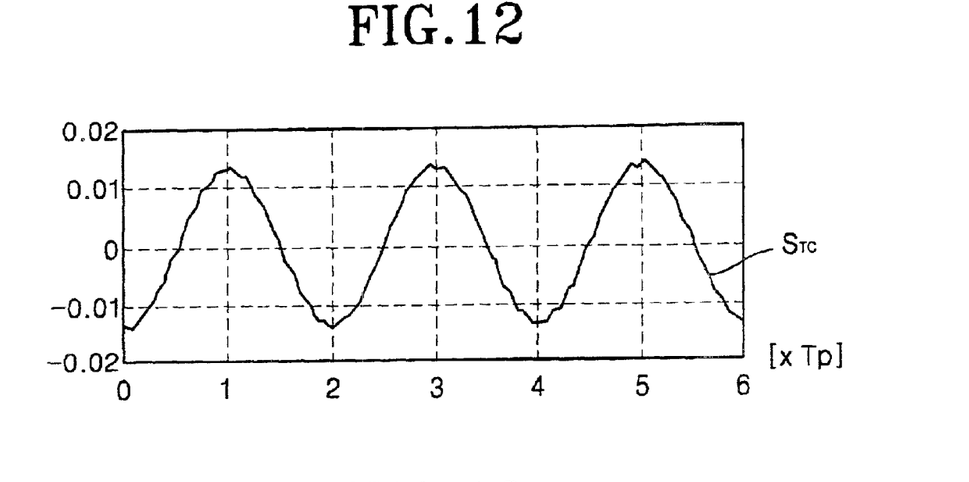
FIG. 12 is a diagram illustrating a waveform of a track cross signal when beam spots are in off-track states.

FIG. 12 shows a waveform of a track cross signal $S_{TC}$ Output from the second signal processing portion shown in FIG. 7 when beam spots are in off-track states. That is, the graph shown in FIG. 12 is a graph of a signal generated by differentiating the above-described signals $S_1$ and $S_2$, and when the centers of land tracks are the points 1, 3, 5, . . . of the horizontal axis, and the centers of groove tracks are the points 0, 2, 4, 6, . . . of the horizontal axis, it can be found that the signals $S_1$ and $S_2$ of FIG. 7 are transformed and amplified, and the track cross signal $S_{TC}$ has positive peak values at the centers of the land tracks, and negative peak values at the centers of the groove tracks.

Figure 13:
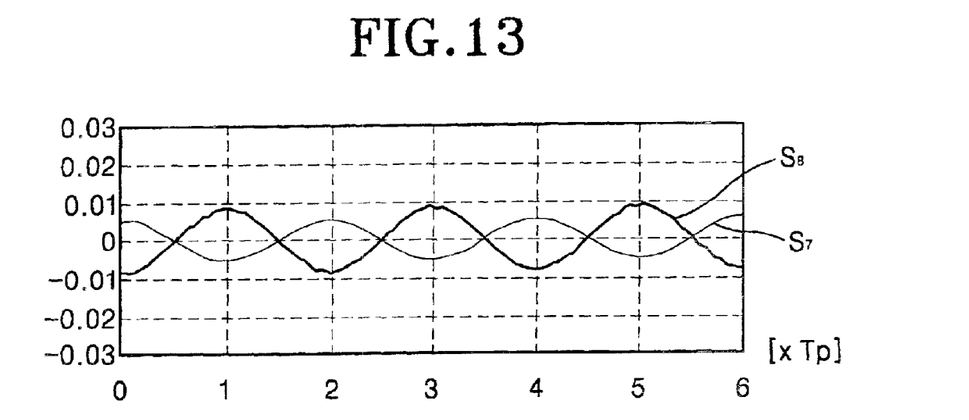
FIG. 13 is a diagram illustrating waveforms of signals $S_7$ and $S_8$ output from first and second differential amplifiers, respectively, shown in FIG. 10 when beam spots are in off-track states.

FIG. 13 shows waveforms of a signal $S_7$ output from the first differential amplifier 83 shown in FIG. 10, and a signal $S_8$ output from the second differential amplifier 86 when an aberration of the sub-beam II in the tangential direction is 0.5 degrees, and when beam spots are in off-track states. Looking at FIG. 13, it is evident that the output signals $S_7$ and $S_8$ have inverted waveforms with respect to each other. Here, the output signal $S_7$ is a signal generated by differentiating the signals $S_3$ and $S_4$ shown in FIG. 8, and exhibits a waveform having the same period as the track cross signal $S_{TC}$. Therefore, it is understood that the output signal $S_7$ can be used as a track cross signal. Also, the output signal $S_8$ is a signal generated by differentiating the signals $S_5$ and $S_6$ shown in FIG. 9, and exhibits an inverted waveform having the same period when compared with the track cross signal $S_{TC}$ of FIG. 12. Therefore, the output signal $S_7$ itself or the inverted signal thereof can be used as a track cross signal.

Figure 14:
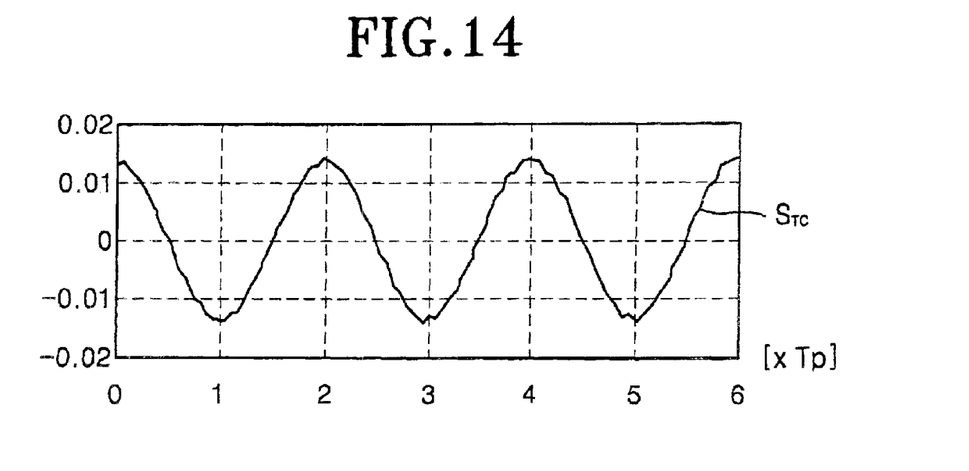
FIG. 14 is a diagram illustrating a waveform of a signal $S_9$ output from fifth summing amplifier shown in FIG. 10 when beam spots are in off-track states.

FIG. 14 shows a waveform of a track cross signal $S_{TC}$ output from the second signal processing portion shown in FIG. 10 when beam spots are in off-track states. That is, the graph shown in FIG. 14 is a graph of a signal generated by differentiating the above-described signals $S_7$ and $S_8$, and when the centers of land tracks are the points 1, 3, 5, . . . along the horizontal axis, and the centers of groove tracks are the points 0, 2, 4, 6, . . . along the horizontal axis, it can be found that the signals $S_7$ and $S_8$ of FIG. 10 are transformed and amplified, and the track cross signal $S_{TC}$ has positive peak values at the centers of land tracks, and negative peak values at the centers of groove tracks.

Here, the waveforms shown in FIGS. 11 through 14 can be inverted depending on the direction of the aberration applied to the sub-beam in the tangential direction, and the magnitude of a signal can vary with the value of the aberration determined by the tangential tilt of the sub-beam.

Figure 15:
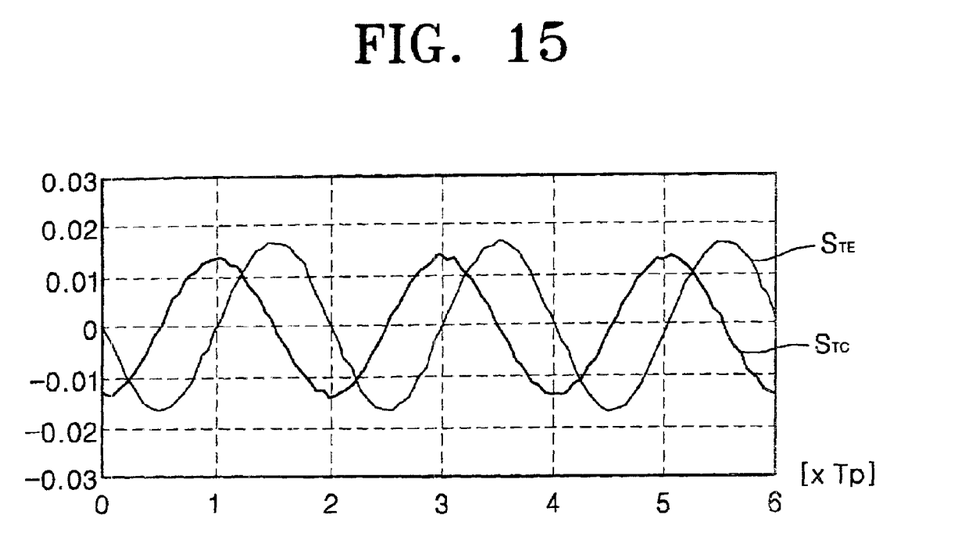
FIG. 15 is a diagram illustrating waveforms of a track cross signal $S_{TC}$ and a track error signal $S_{TE}$ when beam spots are in off-track states.

FIG. 15 shows waveforms of a track cross signal $S_{TC}$ and a track error signal $S_{TE}$ when beam spots are in off-track states. That is, the waveforms represent signal values generated when the numerical aperture (NA) of the objective lens for the optical pickup is 0.65, the wavelength of a source light is 400 nm, and the individual track widths of the lands and grooves are 0.37 μm, and when the sub-beam has an aberration exhibiting a tangential tilt of 0.5 degrees with respect to the recording surface of the optical disk.

From FIG. 15, it is evident that the signal $S_{TC}$ has peak values at the points 1, 2, 3, . . . along the horizontal axis, and the signal $S_{TE}$ has a value of zero. As described above, since there is a phase difference between the two signals, a signal can be generated, which can be used when a seek operation is performed, i.e., the laser beam spot is moved to a target track, and when the relative position of the beam spot with respect to a track on which desired information is recorded, and the movement direction of the beam spot are detected.

Figure 16:
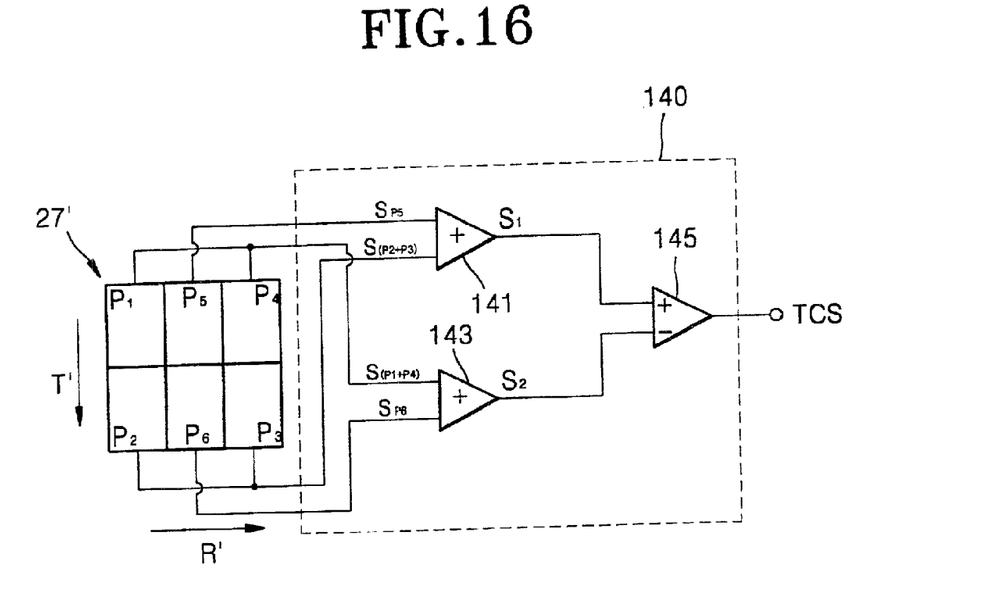
FIG. 16 is a schematic diagram illustrating the structure of a second optical detector according to yet another embodiment of the present invention, and a second signal processing portion for processing signals output from the second optical detector as illustrated in the embodiment of FIG. 6.

A second optical detector 27' according to another embodiment is intended to receive a sub-beam II, as shown in FIG. 3, and to convert the optical signal into an electrical signal. As shown in FIG. 16, the second optical detector 27' is divided into three portions in the direction R', and is divided into two portions in the direction T', and therefore has six separate areas. The second optical detector 27' is comprised of six light receiving portions having a 2×3 array, i.e., first, second, third, fourth, fifth, and sixth light receiving portions $P_1$, $P_2$, $P_3$, $P_4$, $P_5$, and $P_6$. Here, the first, second, third, and fourth light receiving portions $P_1$, $P_2$, $P_3$, and $P_4$ are substantially the same as the first, second, third, and fourth outer light receiving portions $A_1$, $B_1$, $C_1$, and $D_1$ of the second optical detector 27 shown in FIG. 6. In addition, the fifth light receiving portion $P_5$ corresponds to the sum of the areas of the first inner light receiving portion $A_2$ and the fourth inner light receiving portion $D_2$ of the second optical detector 27 shown in FIG. 6. Also, the sixth light receiving portion $P_6$ corresponds to the sum area of the second inner light receiving portion $B_2$ and the third inner light receiving portion $C_2$ of the second optical detector 27 shown in FIG. 6.

In this case, a second signal processing portion 140 according to another embodiment comprises first and second summing amplifiers 141 and 143, and a differential amplifier 145, as in the second signal processing portion 40 shown in FIG. 6.

When the sum signal output from the second light receiving portion $P_2$ and the third light receiving portion $P_3$ is $S_{(P2+P3)}$, and the signal output from the fifth light receiving portion $P_5$ is $S_{P5}$, the first summing amplifier 141 sums the signal $S_{(P2+P3)}$ and the signal $S_{P5}$, and outputs a signal $S_1$. When the sum signal output from the first light receiving portion $P_1$ and the fourth light receiving portion $P_4$ is $S_{(P1+P4)}$, and the signal output from the sixth light receiving portion $P_6$ is $S_{P6}$, the second summing amplifier 143 sums the signal $S_{(P1+P4)}$ and the signal $S_{P6}$, and outputs a signal $S_2$. In addition, the differential amplifier 145 differentiates the signals $S_1$ and $S_2$, and outputs a track cross signal. Therefore, a seek direction detecting signal can be generated by using the phase difference between the track cross signal (TCS) output from the differential amplifier 145 and the track error signal (TES) output from the first signal processing portion 30 shown in FIG. 5.

Figure 17:
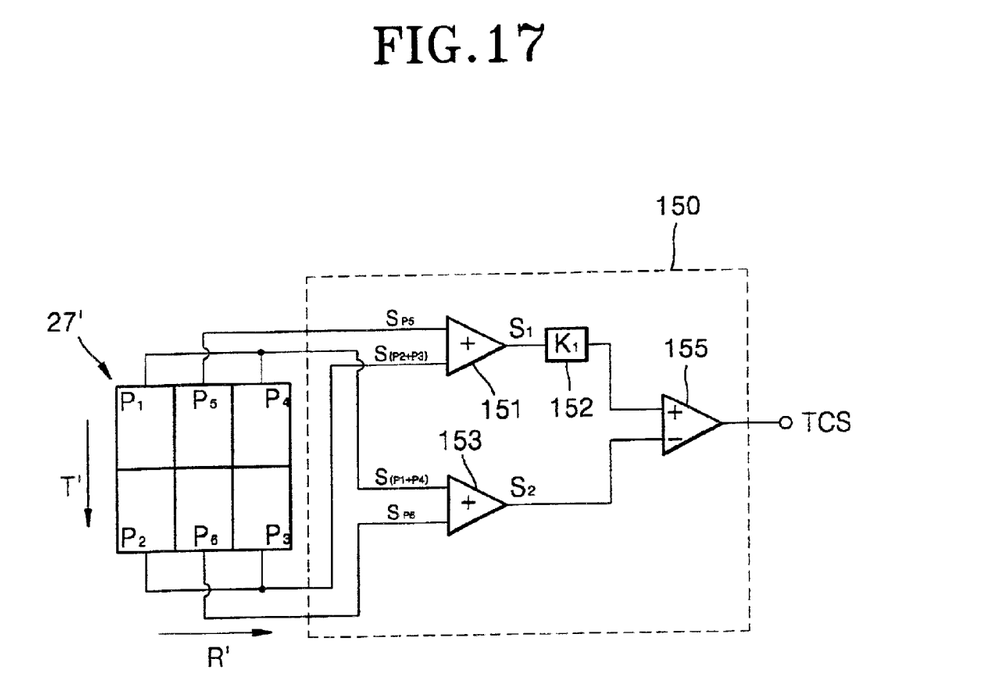
FIGS. 17 through 20 are diagrams illustrating embodiments of a second signal processing portion processing signals output from the second optical detector shown in FIG. 16.

Referring to FIG. 17, a second signal processing portion 150 according to another embodiment of the present invention comprises first and second summing amplifiers 151 and 153, a gain adjusting unit 152, and a differential amplifier 155.

Here, the first and second summing amplifiers 151 and 153 perform the same function as the summing amplifiers 141 and 143 previously described with reference to FIG. 16, and outputs signals $S_1$ and $S_2$, respectively. The gain adjusting unit 152 multiplies the signal $S_1$ output from the first summing amplifier 151 by a predetermined gain coefficient $K_1$, and outputs an adjusted signal $K_1 \times S_1$. In addition, the summing amplifier 155 sums the signal $S_2$ and the signal $K_1 \times S_1$, and outputs a track cross signal (TCS). Therefore, a seek direction detecting signal can be generated by using a phase difference between the output track cross signal (TCS) and the track error signal (TES) output from the first signal processing portion 30 (FIG. 5).

Figure 18:
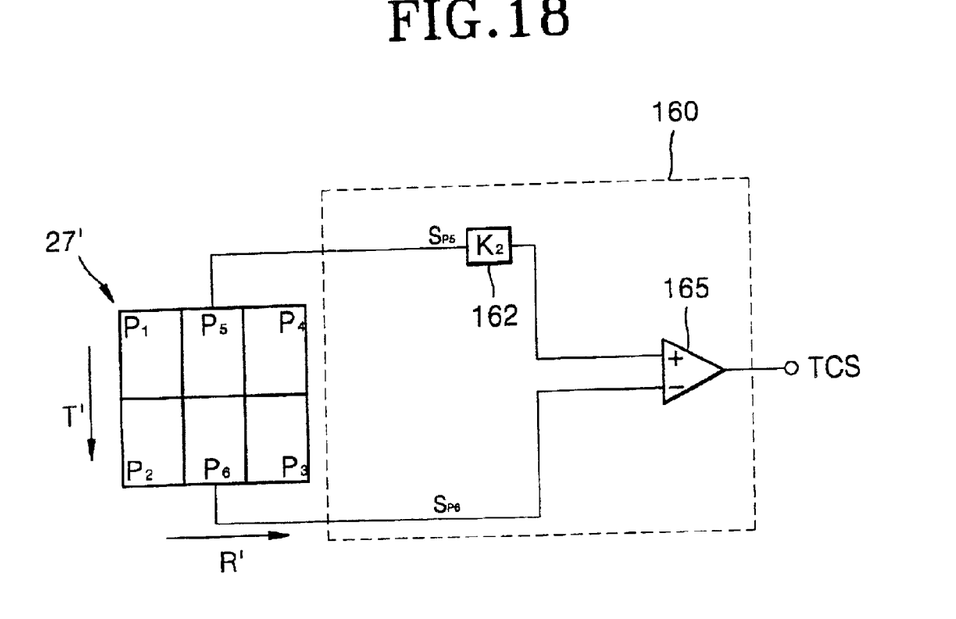

Referring to FIG. 18, a second signal processing portion 160 according to another embodiment of the present invention comprises a gain adjusting means 162, and a differential amplifier 165. The gain adjusting unit 162 multiplies the input signal $S_{P5}$ by a predetermined gain coefficient $K_2$, and outputs a signal $K_2 \times S_{P5}$. The differential amplifier 165 differentiates a signal $S_{P6}$ output from a sixth light receiving portion $P_6$ of a second optical detector 27' and the signal $K_2 \times S_{P5}$, and outputs a track cross signal (TCS). Therefore, a seek direction detecting signal can be generated by using the phase difference between the output track cross signal (TCS) and the track error signal (TES) output from the first signal processing portion 30 (FIG. 5).

Figure 19:
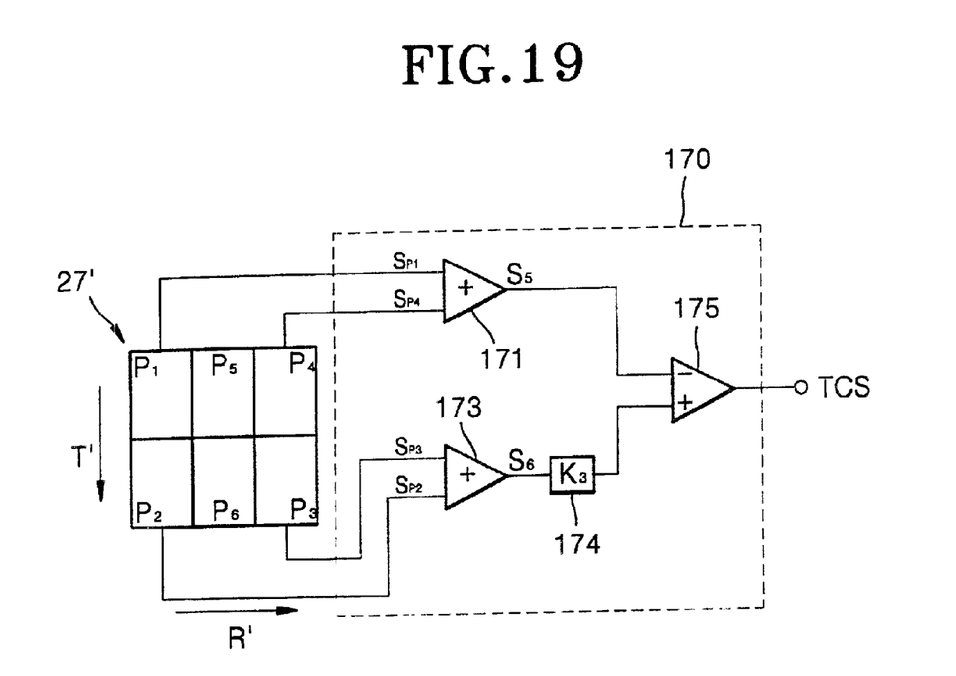

Referring to FIG. 19, a second signal processing portion 170 according to another embodiment of the present invention comprises first and second summing amplifiers 171 and 173, a gain adjusting unit 174, and a differential amplifier 175.

The first summing amplifier 171 sums a signal $S_{P1}$ output from a first light receiving portion $P_1$ and a signal $S_{P4}$ output from a fourth light receiving portion $P_4$, and outputs a sum signal $S_5$. The second summing amplifier 173 sums a signal $S_{P2}$ output from a second light receiving portion $P_2$ and a signal $S_{P3}$ output from a third light receiving portion $P_3$, and outputs a sum signal $S_6$. The gain adjusting unit 174 multiplies the signal $S_6$ output from the second summing amplifier 173 by a predetermined gain coefficient $K_3$, and outputs a signal $K_3 \times S_6$. The differential amplifier 175 differentiates the signal $S_5$ and the signal $K_3 \times S_6$, and outputs a track cross signal (TCS). Therefore, a seek direction detecting signal can be generated by using the phase difference between the output track cross signal (TCS) and the track error signal (TES) output from the first signal processing portion 30 (FIG. 5).

Figure 20:
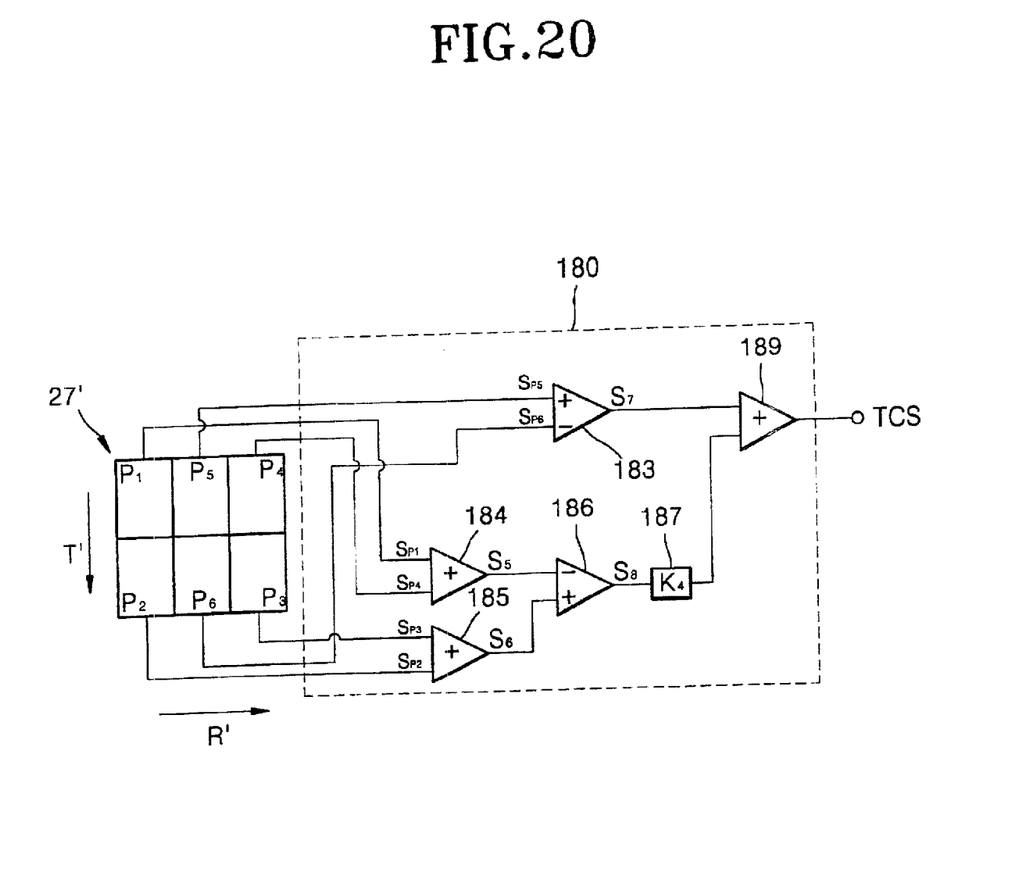

Referring to FIG. 20, in order to generate a track cross signal, a second signal processing portion 180 includes first and second summing amplifiers 184 and 185, first and second differential amplifiers 183 and 186, a gain adjusting unit 187, and a third summing amplifier 189. When signals output from first, second, third, fourth, fifth, and sixth light receiving portions $P_1, P_2, P_3, P_4, P_5,$ and $P_6$ are $S_{P1}, S_{P2}, S_{P3}, S_{P4}, S_{P5},$ and $S_{P6}$, respectively, and the predetermined gain coefficient applied to an input signal into the gain adjusting unit 187 is $K_4$, the second signal processing portion 180 processes the input signals so as to satisfy the following formula (2).

$$TCS = (S_{P5} - S_{P6}) + K_4((S_{P2} + S_{P3}) - (S_{P1} + S_{P4})) \qquad (2)$$

The first summing amplifier 184 sums signals $S_{P1}$ and $S_{P4}$ output from a first light receiving portion $P_1$ and a fourth light receiving portion $P_4$, and outputs a sum signal $S_5$, and the second summing amplifier 185 sums signals $S_{P2}$ and $S_{P3}$ output from a second light receiving portion $P_2$ and a third light receiving portion $P_3$, and outputs a sum signal $S_6$.

In addition, the first differential amplifier 183 differentiates the signal $S_{P5}$ and the signal $S_{P6}$, and outputs a signal $S_7$, and the second differential amplifier 186 differentiates the signal $S_5$ and the signal $S_6$, and outputs a signal $S_8$. The gain adjusting unit 187 multiplies the signal $S_8$ output from the second differential amplifier 186 by a predetermined gain coefficient $K_4$, and outputs a signal $K_4 \times S_8$. The third summing amplifier 189 sums the signal $S_7$ and the signal $K_4 \times S_8$, and outputs a track cross signal (TCS).

Therefore, a seek direction detecting signal can be generated by using the phase difference between the output track cross signal (TCS) and the track error signal (TES) output from the first signal processing portion 30 (FIG. 5). Since the signals detected by the first and second signal processing portions shown in FIGS. 5, and 16 through 20, are substantially the same as the signals described with reference to FIGS. 11 through 15, detailed descriptions thereof will be omitted.

Referring now to FIG. 21, a seek direction detecting signal generator receives a track error signal (TES) from the first signal processor of FIG. 5 and a track cross signal (TCS) from a second signal processor as illustrated in any of FIGS. 6–10 or 16–20, and generates a seek direction detecting signal from the phase difference between the TES signal and the TCS signal.

With the present invention, since the relative position of the center of a beam spot focused on a RAM-type optical disk having a land/groove structure with respect to the center of a disk track can be determined with a main beam and a sub-beam having a predetermined aberration in the tangential direction disposed in the same track, the problem of cross erasure occurring due to the use of first and second sub-beams in the conventional art can be solved fundamentally. In addition, since the main beam and the sub-beam are disposed linearly, there is an advantage in that high-speed access is possible.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. An apparatus generating a seek direction detecting signal for an optical pickup, comprising:

a light dividing unit dividing an incident light beam into at least two beams including a main beam and a sub-beam so that at least two beam spots, including a main beam spot and at least one sub-beam spot having an optical aberration, can be focused in a track direction of an optical disk, wherein a direction of the optical aberration of the sub-beam spot is a tangential direction of the optical disk, and the main beam spot and the sub-beam spot are formed to be aligned along a same track of the optical disk;

an optical detector unit including:
a first optical detector receiving the main beam, and converting the portions of the received beam into electrical signals independent of each other, and
a second optical detector receiving the sub-beam and converting the portions of the received beam into electrical signals independent of each other, wherein the first and second optical detectors comprise a plurality of light receiving portions;

a signal processing portion including:
a first signal processing portion processing a track error signal from the signals output from the first optical detector, and
a second signal processing portion processing a track cross signal from the signals output from the second optical detector; and a generator generating the seek direction detecting signal from a phase difference between the track cross signal and the track error signal.

2. The apparatus as claimed in claim 1, wherein the light receiving portions of the second optical detector are divided into at least three portions in a direction corresponding to a radial direction of the optical disk, and are divided into two portions in a direction corresponding to the tangential direction of the optical disk, where the light receiving portions include at least six separate areas.

3. The apparatus as claimed in claim 1, wherein the light receiving portions of the second optical detector comprise a first light receiving portion having a first outer light receiving portion and a first inner light receiving portion, which are divided in a direction corresponding to a radial direction of the optical disk;

a second light receiving portion having a second outer light receiving portion and a second inner light receiving portion, which are disposed to neighbor the first light receiving portion and in the direction corresponding to the tangential direction of the optical disk;

a third light receiving portion having a third outer light receiving portion and a third inner light receiving portion, which are disposed to neighbor the second light receiving portion; and a fourth light receiving portion having a fourth outer light receiving portion and a fourth inner light receiving portion, which are disposed to neighbor the first and third light receiving portions.

4. The apparatus as claimed in claim 3, wherein each width of the first, second, third, and fourth inner light receiving portions is smaller than a radius of an incident beam spot focused on the optical detector.

5. The apparatus as claimed in claim 4, wherein a sum of the widths of the first and fourth inner light receiving portions in the direction corresponding to the radial direction of the optical disk, and the sum of the widths of the second and third inner light receiving portions in the same direction are each 0.2 to 0.8 times a diameter of the incident beam spot focused on the optical detector.

6. The apparatus as claimed in claim 3, wherein, when a sum signal of signals output from the first and fourth inner light receiving portions is $S_{(A2+D2)}$, the sum signal of signals output from the second and third outer light receiving portions is $S_{(B1+C1)}$, the sum signal of signals output from the first and fourth outer light receiving portions is $S_{(A1+D1)}$, and the sum signal of signals output from the second and third inner light receiving portions is $S_{(B2+C2)}$, the second signal processing portion comprises:

a first summing amplifier summing the signal $S_{(A2+D2)}$ and the signal $S_{(B1+C1)}$, and outputting a signal $S_1$;

a second summing amplifier summing the signal $S_{(A1+D1)}$ and the signal $S_{(B2+C2)}$, and outputting a signal $S_2$; and a differential amplifier differentiating the signals $S_1$ and $S_2$, and outputting a track cross signal, where the second signal processing portion is adapted to generate the seek direction detecting signal by using the phase difference between the track cross signal output from the differential amplifier and the track error signal output from the first signal processing portion.

* * * * *